US006220777B1

(12) United States Patent
Clarke et al.

(10) Patent No.: US 6,220,777 B1
(45) Date of Patent: Apr. 24, 2001

(54) METHODS AND APPARATUS FOR PRODUCING ULTRASONIC WELD JOINTS FOR INJECTION MOLDED PLASTIC PARTS

(75) Inventors: John E. Clarke, Colts Neck, NJ (US); Vince Joseph Masterson, Buffalo Grove, IL (US); Ningsheng Zhu, Whippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/139,145

(22) Filed: Aug. 24, 1998

(51) Int. Cl.$^7$ ................................ B32B 31/00; B25G 3/34

(52) U.S. Cl. ..................... 403/270; 403/265; 403/267; 403/335; 403/336; 156/156; 156/73.1; 156/580.1

(58) Field of Search .................................. 403/270, 265, 403/267, 335, 336, 228, 140; 156/73.1; 228/110.1

(56) References Cited

U.S. PATENT DOCUMENTS

| 4,564,932 | * | 1/1986 | Lange ............................ 156/73.1 X |
| 4,781,423 | * | 11/1988 | Muenzer et al. ................... 312/183 |
| 5,114,807 | * | 5/1992 | Rowlette ............................ 429/152 |
| 5,335,771 | * | 8/1994 | Murphy ............................ 206/328 |
| 5,454,506 | * | 10/1995 | Jordhamo et al. ............ 228/110.1 X |
| 6,019,628 | * | 2/2000 | Shinchi ............................ 439/465 |

OTHER PUBLICATIONS

Branson Sonic Power Company, Technical Brochure, "Joint Design for Ultrasonic Welding", 1980.*

"Ultrasonis Assembly", Machine Design, Mar. 16, 1967, The Penton Publishing Co. Cleveland, Ohio.*

* cited by examiner

*Primary Examiner*—Lynne H. Browne
*Assistant Examiner*—Ernesto Garcia
(74) *Attorney, Agent, or Firm*—Priest & Goldstein, PLLC

(57) ABSTRACT

A step joint between two plastic pieces suitable for an ultrasonic weld joint. A first plastic piece includes a series of ribs, each rib having generally horizontal top surface. A generally vertical section extends upward behind the ribs. A second plastic piece includes a generally horizontal section for mating with the ribs, the horizontal section of the second plastic piece covering the generally horizontal section of two or more ribs. The second plastic piece also includes a generally vertical section suitable for mating with the generally vertical section of the second plastic piece. A plastic assembly according to another aspect of the present invention includes the first plastic piece and the second plastic piece, a joint between the first and second plastic pieces formed by an abutment between the generally horizontal surface of the second plastic piece and the top surface of the one or more ribs, and between the generally vertical surface of the second plastic piece and the strip of the second plastic piece, and a weld between the first plastic piece and the second plastic piece formed by melted plastic from a partial melt of the first plastic piece and the second plastic piece, the melted plastic flowing into the joint between the first plastic piece and the second plastic piece and hardening to form the weld.

6 Claims, 5 Drawing Sheets

METHODS AND APPARATUS FOR PRODUCING ULTRASONIC WELD JOINTS FOR INJECTION MOLDED PLASTIC PARTS

FIELD OF THE INVENTION

The present invention relates generally to improvements in injection molding of plastics. More particularly, the invention relates to advantageous aspects of methods and apparatus for producing ultrasonic weld joints for injection molded plastic parts.

BACKGROUND OF THE INVENTION

The step joint is a particular type of ultrasonic joint which is useful in joining plastic parts. This type of joint is frequently selected as the exuded melt does not result in a visual defect. Moreover, the exuded melt assists in locating the part and improves the shear resistance of the interface. However, as the nominal wall thickness of the plastic parts to be joined becomes thinner, the wall section required by the typical geometry of the step joint becomes thicker relative to the nominal wall thickness. This localized thick section will create a cosmetic blemish, known as a sink mark, on the surface of the part. This sink mark or depression is created as the hot resin cools after molding.

One prior art solution is to create a style line on the outside of the part to eliminate the extra thickness of plastic which creates the sink mark. In many cases, however, such a style line will not be acceptable because it affects the appearance of the part.

A need therefore exists in the art for a part design which permits a step joint interface which will create a structurally robust joint without creating a sink mark and without creating a style line

SUMMARY OF THE INVENTION

A joint interface according to the present invention replaces a continuous surface with an interrupted surface created by a series of ribs. At a cross section through a rib, the geometry produces a localized thick plastic region. At a cross section in between the ribs, the geometry produces a desired uniform wall thickness.

A more complete understanding of the present invention, as well as further features and advantages of the invention, will be apparent from the following Detailed Description and the accompanying drawings.

DETAILED DESCRIPTION

Figure 1:
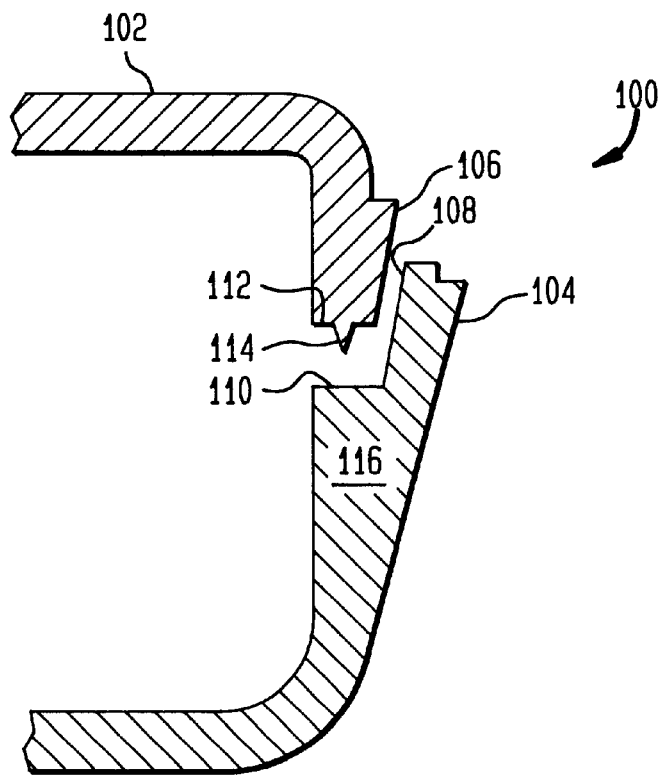
FIG. 1 illustrates a step joint design according to the prior art.

FIG. 1 illustrates a step joint 100 which is formed between a first plastic piece 102 and a second plastic piece 104 in a typical prior art process. The first and second plastic pieces 102 and 104 include first and second generally vertical mating sections 106 and 108, respectively. The second plastic piece 104 also includes a continuous horizontal surface 110, with which a horizontal surface 112 of the first plastic piece 102 is joined to make a weld. The horizontal surface 112 of the first plastic piece also includes an energy director 114 for appropriately directing energy to melt appropriate parts of the first plastic piece 102 and the second plastic piece 104. The second plastic piece 104 includes a relatively thick wall section 116 in the vicinity of the continuous surface 110. The requirement for a thick wall section 116 in the second plastic piece 104 causes the development of a sink mark in the molding of the second plastic piece 104, as the hot resin cools after molding. The second plastic piece 104 therefore includes a cosmetic blemish.

Figure 2:
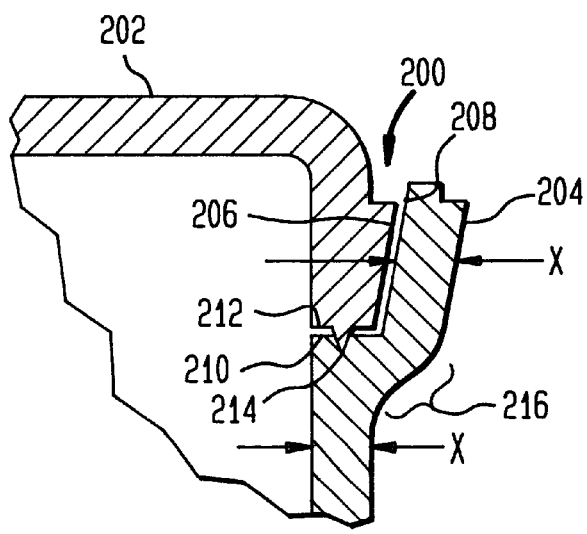
FIG. 2 illustrates a step joint design having a style line according to the prior art.

FIG. 2 illustrates a step joint 200 which is formed between a first plastic piece 202 and a second plastic piece 204 according to a typical prior art process. The first and second plastic pieces 202 and 204 include first and second generally vertical mating sections 206 and 208, respectively. The second plastic piece 204 also includes a continuous horizontal surface 210, with which a horizontal surface 212 of the first plastic piece 202 is joined to make a weld. The horizontal surface 212 of the first plastic piece also includes an energy director 214 for appropriately directing energy to melt appropriate parts of first plastic piece 202 and second plastic piece 204. The second plastic piece 204 includes a contour section 216 in the vicinity of the continuous surface 210. The contour section 216 of the second plastic piece 204 allows the thickness of the second plastic piece 204 to be generally uniform. Because the thickness of the second plastic piece 204 is generally uniform, the molding of the second plastic piece 204 does not cause the creation of a sink mark during cooling of the second plastic piece 204 after molding. However, the contour 216 may not be visually acceptable.

Figure 3A:
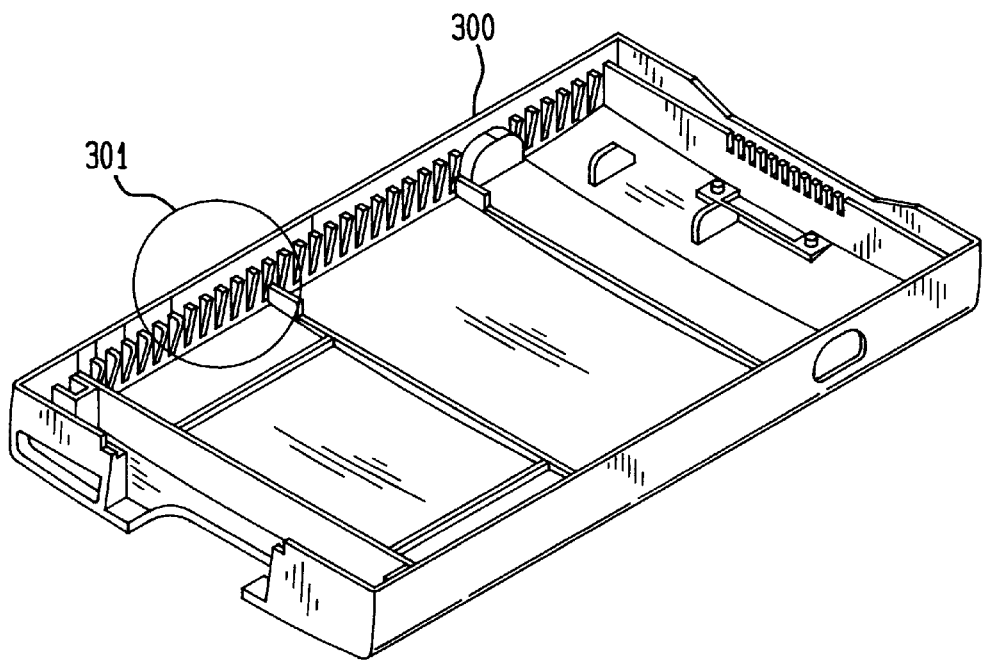
FIGS. 3A and 3B illustrate an interrupted surface having a series of ribs according to an aspect of the present invention.
Figure 3B:
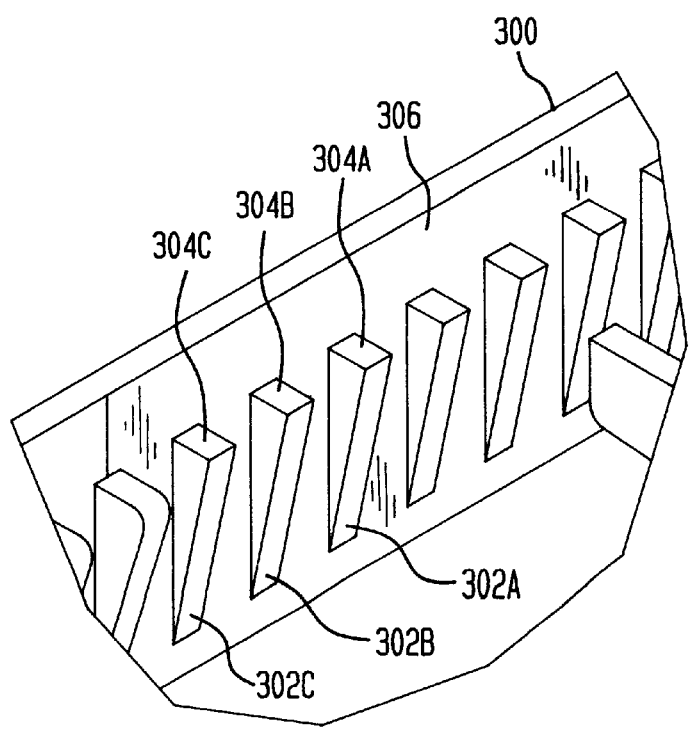

FIGS. 3A and 3B illustrate a plastic piece 300 having a plurality of plastic ribs 302A–C according to an aspect of the present invention. FIG. 3A shows an overall view of the plastic piece 300, and FIG. 3B shows further details of ribbed area 301 of FIG. 3A. Each of the plastic ribs 302A–C has a generally horizontal surface 304A–C, respectively. The plastic piece 300 also includes a continuous relatively vertical surface 306 extending upward behind the plastic ribs 302A–C. The ribs 302A–C and the vertical surface 306 are suitable for forming a step joint with an appropriately shaped mating piece.

Figure 4A:
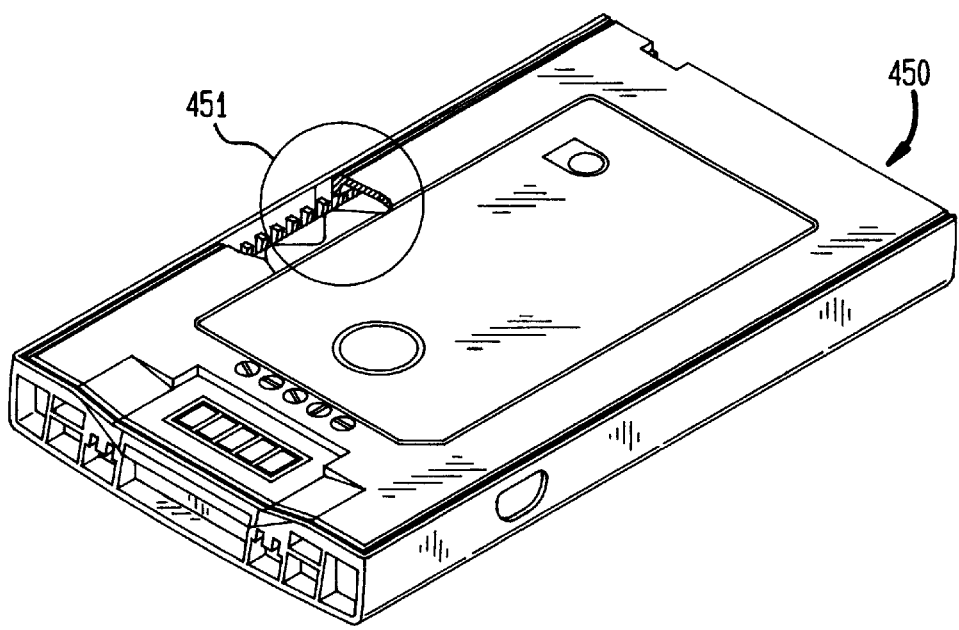
FIGS. 4A and 4B illustrate an overall device employing a weld joint in accordance with the present invention, and a perspective view of the weld joint which employs an interrupted surface having a series of ribs according to the present invention.
Figure 4B:
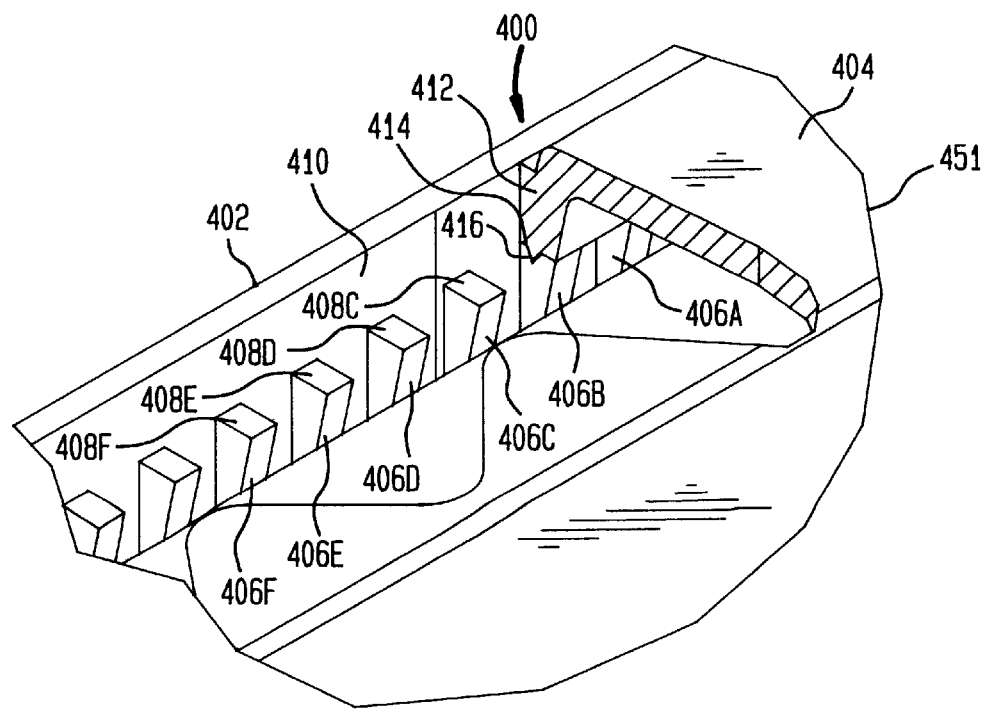

FIGS. 4A and 4B illustrate aspects of a step joint 400 formed between a first plastic piece 402 and a second plastic piece 404 according to an aspect of the present invention. FIG. 4A illustrates an overall article 450 employing the step joint 400 which is formed in an area 451 shown cut away in FIG. 4A. FIG. 4B is a blowup of area 451 showing further details thereof. The first plastic piece includes a plurality of plastic ribs of which ribs 406A–F are shown, each of the plastic ribs 406A–F having a generally horizontal surface of which the surfaces 408C–408F are visible. The horizontal surfaces of the ribs 406A and 406B are obscured, but are similar to the horizontal surfaces 408C–F. The first plastic piece also includes a continuous generally vertical surface 410 which extends upward behind ribs 406A–F.

The second plastic piece 404 has a generally vertical mating section 412 which mates with the vertical surface 410. The second plastic piece 404 also has a horizontal surface 414 with an energy director 416. The horizontal surface 414 of the second plastic piece 404 is shown joined with the horizontal surfaces 408A and 408B of ribs 406A and 406B. When energy is applied to the first plastic piece 402 and the second plastic piece 404, a weld is produced.

Figure 5:
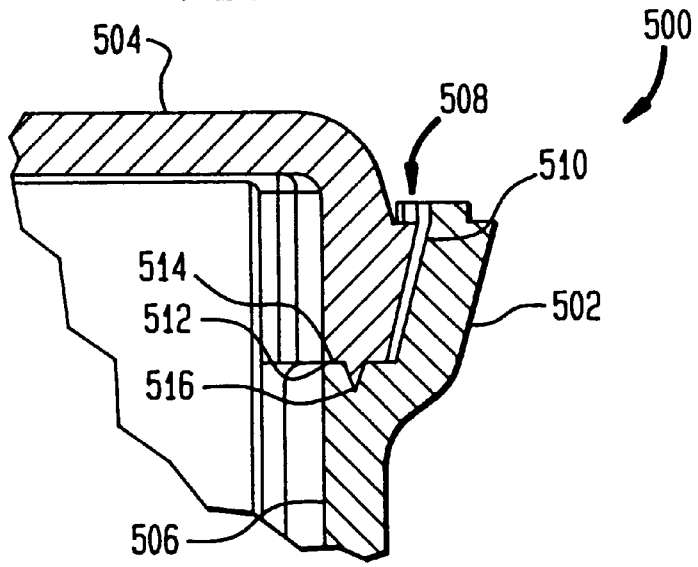
FIG. 5 is a cross-sectional view as seen through a rib of a weld joint having a series of ribs according to an aspect of the present invention.

FIG. 5 is a cross-sectional view of a step joint 500 between a first plastic piece 502 and a second plastic piece 504 according to the present invention. The first plastic piece also includes a plastic rib 506. The view of FIG. 5 is a cross-section through the plastic rib 506. The first plastic piece 502 has a generally vertical section 508 mating with a corresponding generally vertical section 510 of the second plastic piece 504. The rib 506 has a generally horizontal surface 512 mated with a generally horizontal surface 514 of the second plastic piece 504. The horizontal surface 514 of the second plastic piece 504 also includes an energy director 516. It can be seen that the first plastic piece 502 lacks a contour section. The use of the rib 506 gives a strong weld without a sink mark.

Figure 6:
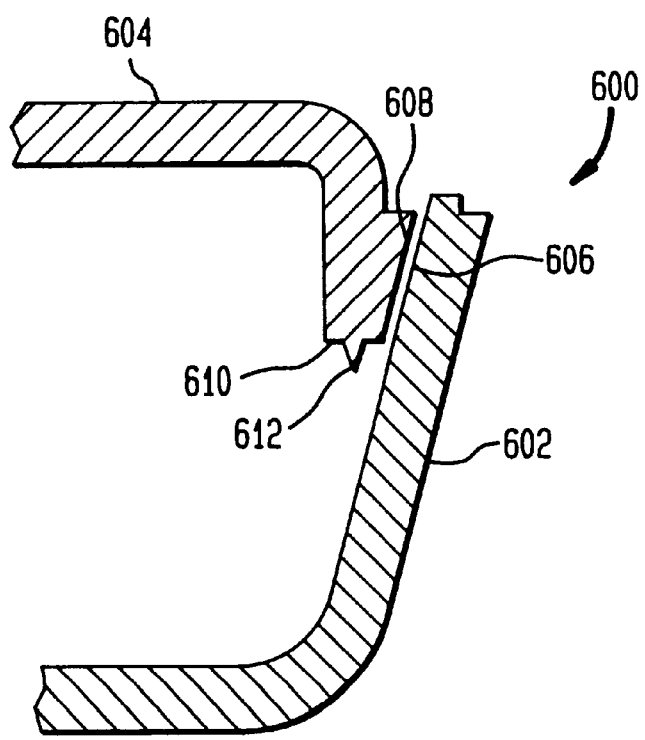
FIG. 6 is a cross sectional view as seen between ribs of a weld joint employing an interrupted surface having a series of ribs according to an aspect of the present invention.

FIG. 6 is a cross-sectional view of a step joint 600 between a first plastic piece 602 and a second plastic piece 604 according to the present invention. FIG. 6 is a cross section showing a section of the first plastic piece 602 and the second plastic piece 604 at a portion in between plastic ribs. The first plastic piece 602 has a generally vertical section 606 mating with a corresponding generally vertical section 608 of the second plastic piece 604. The second plastic piece 604 has a generally horizontal surface 610. The horizontal surface 610 of the second plastic piece 604 also includes an energy director 612. It can be seen that the generally vertical section 606 of the first plastic piece 602 is of a uniform thickness and lacks a contour section.

Figure 7:
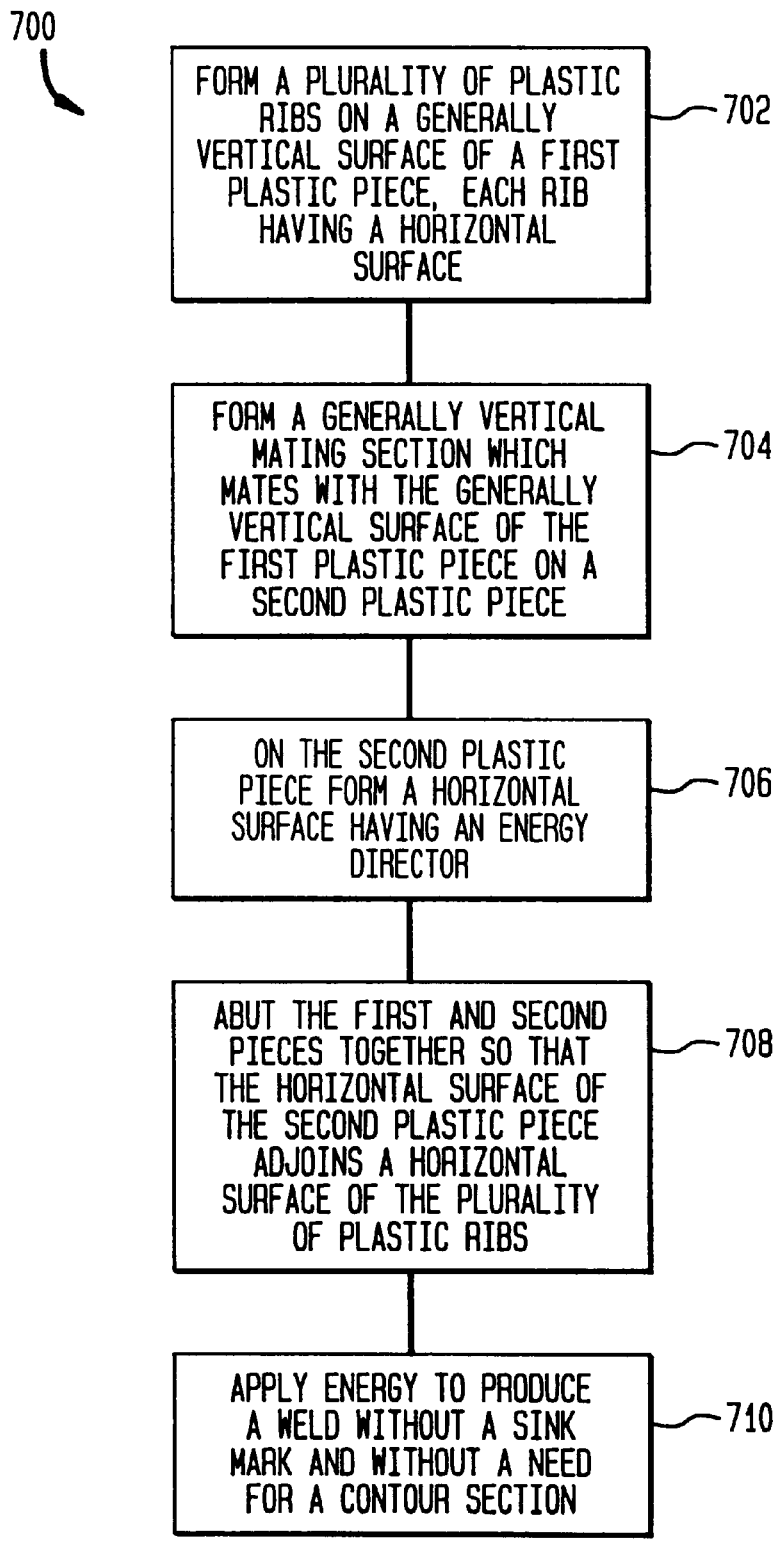
FIG. 7 is a flowchart of a process for producing a weld joint in accordance with the present invention.

FIG. 7 is a flowchart of a process 700 for forming a weld joint in accordance with the present invention. It will be recognized that the process 700 may be suitably employed to join together any two plastic pieces requiring an ultrasonic weld joint such as the pieces forming the object 450 of FIG. 4A.

In step 702, a plurality of plastic ribs, such as ribs 302A–302C of FIG. 3, are formed on a generally vertical surface, such as surface 306, of a first plastic piece. Each of the ribs has a generally horizontal surface. In step 704, a generally vertical mating section is formed on a second plastic piece. Next, in step 706, a horizontal surface which will preferably include an energy director, such as director 612 of FIG. 6, is formed on the second piece. In step 708, the first and second pieces are abutted together so that the horizontal surface of the second plastic piece adjoins a horizontal surface, such as horizontal surfaces 304A–304C of FIG. 3B, of the plurality of plastic ribs. Finally, in step 710, energy is applied to produce a weld.

While the present invention is disclosed in the context of a presently preferred embodiment, it will be recognized that a wide variety of implementations may be employed by persons of ordinary skill in the art consistent with the above discussion and the claims which follow below.

We claim:

1. A step joint comprising:
   a first plastic piece comprising:
      a strip having a horizontal and a vertical extent, the vertical extent having top and bottom extremes;
      a series of ribs, each rib having a front surface and a rear surface, each rib being attached to the strip at the rear surface, each rib being oriented parallel to the vertical extent of the strip, each rib extending outward from the strip, each rib further having a top surface extending outward from the strip, the top surface being oriented generally perpendicular to the vertical extent and generally parallel to the horizontal extent of the strip, the top surface of each rib being positioned at an equal distance from the top extreme of the vertical extent of the strip, the vertical extent of the strip extending beyond the top surface of the ribs, the ribs being separated by a series of gaps between ribs along the horizontal surface of the strip; and
   a second plastic piece comprising:
      a generally horizontal surface for mating with the top surface of one or more ribs, the horizontal surface having an energy director for directing energy used in creating a weld;
      a generally vertical surface oriented generally perpendicular to the generally horizontal surface, the generally vertical surface being oriented to mate with the strip at the vertical extent of the strip extending beyond the top surface of the ribs.

2. The step joint of claim 1 wherein the ribs of the first plastic piece are of equal size.

3. The step joint of claim 2 wherein the ribs of the first plastic piece are equally spaced.

4. A method of forming a step joint comprising:
   forming a first plastic piece comprising:
      a strip having a horizontal and a vertical extent, the vertical extent having top and bottom extremes;
      a series of equally spaced ribs, each rib having a front surface and a rear surface, each rib being attached to the strip at the rear surface, each rib being oriented parallel to the vertical extent of the strip, each rib extending outward from the strip, each rib further having a top surface extending outward from the strip, the top surface being oriented generally perpendicular to the vertical extent and generally parallel to the horizontal extent of the strip, the top surface of each rib being positioned at an equal distance from the top extreme of the vertical extent of the strip, the vertical extent of the strip extending beyond the top surface of the ribs, the ribs being separated by a series of equally spaced gaps between ribs along the horizontal surface of the strip; and
   forming a second plastic piece comprising:
      a generally horizontal surface for mating with the top surface of one or more ribs, the horizontal surface having an energy director for directing energy used in creating a weld;
      a generally vertical surface oriented generally perpendicular to the generally horizontal surface, the generally vertical surface being oriented to mate with the strip at the vertical extent of the strip extending beyond the top surface of the ribs;
   abutting the first and second plastic pieces so that the generally horizontal surface of the second piece adjoins the top surface of one or more ribs of the first piece; and
   applying energy to the generally horizontal surface and the top surfaces of the one or more ribs to produce a weld.

5. A plastic assembly comprising:
a first plastic piece comprising:
- a strip having a horizontal and a vertical extent, the vertical extent having top and bottom extremes; and
- a series of ribs, each rib having a front surface and a rear surface, each rib being attached to a strip at the rear surface, each rib being oriented parallel to the vertical extent of the strip, each rib extending outward from the strip, each rib further having a top surface extending outward from the strip, the top surface being oriented generally perpendicular to the vertical extent and generally parallel to the horizontal extent of the strip, the top surface of each rib being positioned between the extremes of the vertical extent of the strip;

a second plastic piece adapted to mate with the first plastic piece, comprising:
- a generally horizontal surface oriented to mate with the top surface of the one or more ribs, the horizontal surface having an energy director for directing energy used in creating a weld;
- a generally vertical surface oriented generally perpendicular to the generally horizontal surface, the generally vertical surface being oriented to mate with the strip at the vertical extent of the strip extending beyond the top surface of the ribs;

a joint between the first plastic piece and the second plastic piece comprising an abutment between the generally horizontal surface of the second plastic piece and the top surface of the one or more ribs, and between the generally vertical surface of the second plastic piece and the strip of the first plastic piece; and a weld between the first plastic piece and the second plastic piece formed by melted plastic from a partial melt of the first plastic piece and the second plastic piece, the melted plastic flowing into the joint between the first plastic piece and the second plastic piece and hardening to form the weld.

6. A method of forming a plastic assembly comprising the steps of:

forming a first plastic piece comprising:
- a strip having a horizontal and a vertical extent, the vertical extent having top and bottom extremes; and
- a series of ribs, each rib having a front surface and a rear surface, each rib being attached to the strip at the rear surface, each rib being oriented parallel to the vertical extent of the strip, each rib extending outward from the strip, each rib further having a top surface extending outward from the strip, the top surface being oriented generally perpendicular to the vertical extent and generally parallel to the horizontal extent of the strip, the top surface of each rib being positioned between the extremes of the vertical extent of the strip;

forming a second plastic piece adapted to mate with the first plastic piece, comprising:
- a generally horizontal surface oriented to mate with the top surface of the one or more ribs, the horizontal surface having an energy director for directing energy used in creating a weld;
- a generally vertical surface oriented generally perpendicular to the generally horizontal surface, the generally vertical surface being oriented to mate with the strip at the vertical extent of the strip extending beyond the top surface of the ribs;

aligning the first plastic piece and the second plastic piece to form a joint comprising an abutment between the generally horizontal surface of the second plastic piece and the top surface of the one or more ribs, and between the generally vertical surface of the second plastic piece and the strip of the first plastic piece; and forming a weld between the first plastic piece and the second plastic piece by performing a partial melt of the first plastic piece and the second plastic piece to produce melted plastic, the melted plastic flowing into the joint between the first plastic piece and the second plastic piece and hardening to form the weld.

* * * * *